US00RE48472E

(19) United States
(12) Reissued Patent
Wu et al.

(10) Patent Number: US RE48,472 E
(45) Date of Reissued Patent: *Mar. 16, 2021

(54) CHOKE HAVING A CORE WITH A PILLAR HAVING A NON-CIRCULAR AND NON-RECTANGULAR CROSS SECTION

(71) Applicant: CYNTEC CO., LTD., Hsinchu (TW)

(72) Inventors: Tsung-Chan Wu, Yanshuei Township (TW); Roger Hsieh, Jhubei (TW); Yi-Min Huang, Hsinchu (TW); Lan-Chin Hsieh, Kaohsiung (TW); Yu-Ching Kuo, Zhunan Township (TW)

(73) Assignee: CYNTEC CO., LTD., Hsin-Chu (TW)

( * ) Notice: This patent is subject to a terminal disclaimer.

(21) Appl. No.: 15/689,676

(22) Filed: Aug. 29, 2017

Related U.S. Patent Documents

Reissue of:
(64) Patent No.: 9,208,937
Issued: Dec. 8, 2015
Appl. No.: 13/331,786
Filed: Dec. 20, 2011

U.S. Applications:
(63) Continuation-in-part of application No. 12/709,912, filed on Feb. 22, 2010, now Pat. No. 8,212,641.

(30) Foreign Application Priority Data

Feb. 27, 2009 (TW) ..... 98106464

(51) Int. Cl.
*H01F 27/02* (2006.01)
*H01F 17/04* (2006.01)

(52) U.S. Cl.
CPC ..... *H01F 17/045* (2013.01); *H01F 27/02* (2013.01); *H01F 2017/048* (2013.01)

(58) Field of Classification Search
CPC ..... H01F 17/045; H01F 2017/048; H01F 27/325; H01F 30/06
(Continued)

(56) References Cited

U.S. PATENT DOCUMENTS 4,600,911 A * 7/1986 Meinert ..... H01F 27/245 336/212
5,726,616 A * 3/1998 Bell ..... H01F 27/266 336/192
(Continued)

FOREIGN PATENT DOCUMENTS

FR 1493312 A * 8/1967 ..... H01F 27/245
JP 60-206122 A 10/1985
(Continued)

*Primary Examiner* — Anjan K Deb
(74) *Attorney, Agent, or Firm* — Birch, Stewart, Kolasch & Birch, LLP

(57) ABSTRACT

A choke includes a single-piece core entirely made of a same material, the single-piece core having two boards and a pillar located between the two boards, a winding space being located among the two boards and the pillar, wherein the pillar has a non-circular and non-rectangular cross section along a direction substantially perpendicular to an axial direction of the pillar, the cross section of the pillar has a first axis and a second axis intersecting with each other at a center of the cross section of the pillar and are substantially perpendicular with each other, the first axis is longer than the second axis, and the cross section of the pillar is substantially symmetrical to both of the first axis and the second axis.

12 Claims, 7 Drawing Sheets

(58) Field of Classification Search
USPC ..... 336/67, 82, 83, 177, 205, 221, 233
See application file for complete search history.

(56) References Cited

U.S. PATENT DOCUMENTS

| | | | | |
|---|---|---|---|---|
| 6,144,280 | A | 11/2000 | Amada | |
| 6,198,373 | B1 * | 3/2001 | Ogawa et al. | H01F 17/0033 336/83 |
| 6,449,830 | B1 | 9/2002 | Amada | |
| 6,768,409 | B2 | 7/2004 | Inoue et al. | |
| 6,774,755 | B2 | 8/2004 | Nakata et al. | |
| 6,907,100 | B2 | 6/2005 | Taguchi | |
| 6,919,788 | B2 | 7/2005 | Holdahl et al. | |
| 7,209,022 | B2 * | 4/2007 | Kuroiwa et al. | H01F 17/045 336/200 |
| 7,358,843 | B2 | 4/2008 | Takayama et al. | |
| 7,477,122 | B2 | 1/2009 | Iguchi et al. | |
| 7,495,538 | B2 | 2/2009 | Tsunemi et al. | |
| 7,656,260 | B2 | 2/2010 | Suzuki et al. | |
| 7,786,838 | B2 | 8/2010 | Nakada et al. | |
| 7,821,371 | B2 | 10/2010 | Inoue et al. | |
| 7,898,375 | B2 | 3/2011 | Kitajima et al. | H01F 17/045 336/185 |
| 10,763,030 | B2 * | 9/2020 | Sarver | H01F 27/263 |
| 2001/0009342 | A1 | 7/2001 | Furukawa | |
| 2001/0038327 | A1 * | 11/2001 | Aoki | H01F 17/045 336/83 |
| 2002/0017971 | A1 * | 2/2002 | Koyama et al. | 336/83 |
| 2002/0033778 | A1 * | 3/2002 | Yoshinomoto et al. | 343/895 |
| 2002/0113680 | A1 * | 8/2002 | Kato | H01F 17/04 336/83 |
| 2002/0153981 | A1 | 10/2002 | Zhao | |
| 2002/0163413 | A1 * | 11/2002 | Holdahl et al. | 336/192 |
| 2002/0180572 | A1 * | 12/2002 | Kakehashi | C12N 15/101 335/296 |
| 2002/0190832 | A1 * | 12/2002 | Amada et al. | H01F 17/045 336/192 |
| 2003/0071704 | A1 * | 4/2003 | Toi et al. | H01F 17/045 336/83 |
| 2003/0184423 | A1 * | 10/2003 | Holdahl | H01F 3/14 336/83 |
| 2004/0207503 | A1 * | 10/2004 | Flanders | H01F 3/14 336/223 |
| 2006/0071749 | A1 * | 4/2006 | Aoki | H01F 17/045 336/83 |
| 2006/0171127 | A1 * | 8/2006 | Kadoya | B29C 45/14377 361/752 |
| 2008/0055034 | A1 * | 3/2008 | Tsunemi et al. | 336/83 |
| 2009/0231077 | A1 | 9/2009 | Liao et al. | |
| 2009/0237193 | A1 * | 9/2009 | Wedley | H01F 3/10 336/83 |
| 2010/0141368 | A1 | 6/2010 | Iwakura et al. | |
| 2010/0214050 | A1 * | 8/2010 | Opina et al. | 336/192 |
| 2010/0321144 | A1 | 12/2010 | Kudo et al. | |
| 2017/0330672 | A1 * | 11/2017 | Uchida | H01F 27/2823 |

FOREIGN PATENT DOCUMENTS

| | | | |
|---|---|---|---|
| JP | 3004417 | | 11/1994 |
| JP | 2003297642 | A | * 10/2003 |
| JP | 2007-67081 | A | 3/2007 |
| JP | 20070678081 | | 3/2007 |
| JP | 2008-300653 | A | 12/2008 |
| JP | 2009-44068 | A | 2/2009 |
| JP | 200904468 | | 2/2009 |
| JP | 20090411068 | | 2/2009 |
| JP | 2010-147272 | A | 7/2010 |
| JP | 2010-1417272 | A | 7/2010 |
| JP | 2010-177492 | A | 8/2010 |
| TW | 200522092 | | 7/2005 |
| TW | 200746191 | | 12/2007 |

* cited by examiner

CHOKE HAVING A CORE WITH A PILLAR HAVING A NON-CIRCULAR AND NON-RECTANGULAR CROSS SECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a Continuation-in-part application of application Ser. No. 12/709,912 filed on Feb. 22, 2010 now U.S. Pat. No. 8,212,641 and for which priority is claimed under 35 U.S.C. § 120. This application claims priority to Application No. 98106464 filed in Taiwan on Feb. 27, 2009 under 35 U.S.C. § 119(a). The entire contents of all are hereby incorporated by reference.

BACKGROUND OF THE INVENTION

1. Field of the Invention

The present invention relates to a core adapted for a choke and, more particularly, to a core having a pillar with a non-circular and non-rectangular cross section.

2. Background of the Invention

A choke is used for stabilizing a circuit current to achieve a noise filtering effect, and a function thereof is similar to that of a capacitor, by which stabilization of the current is adjusted by storing and releasing electrical energy of the circuit. Compared to the capacitor that stores the electrical energy by an electrical field (electric charge), the choke stores the same by a magnetic field.

In the past, the chokes are generally applied in electronic devices such as DC/DC converters and battery chargers, and applied in transmission devices such as modems, asymmetric digital subscriber lines (ADSL) or local area networks (LAN), etc. The chokes have also been widely applied to information technology products such as notebooks, mobile phones, LCD displays, and digital cameras, etc. Therefore, a height and size of the choke will be one the concerns due to the trend of minimizing the size and weight of the information technology products.

As shown in FIG. 1, the choke 1 disclosed in U.S. Pat. No. 7,209,022 includes a drum-core 10, a wire 12, an exterior resin 14, and a pair of external electrodes 16.

Furthermore, as shown in FIG. 2, the cross section of the pillar 100 of the drum-core 10 is circular. In general, the larger an area of the cross section of the pillar 100 is, the better the characteristics of the choke 1 are. However, since the shape of the cross section of the pillar 100 is circular and the winding space S has to be reserved for winding the wire 12, the area of the cross section of the pillar 100 is limited accordingly, so that saturation current cannot be raised effectively.

There is another drum-core with a rectangular pillar disclosed in U.S. Pat. No. 7,495,538 (hereinafter the '538 patent). In the '538 patent, since the shape of the cross section of the pillar is rectangular, the wire may be damaged at sharp corners of the pillar, and the characteristics of the choke (e.g., saturation current, direct current resistance, magnetic flux density, etc.) are worse.

SUMMARY OF THE INVENTION

Accordingly, it is an object of the present invention to provide a choke having a core with a pillar of a non-circular and non-rectangular cross section.

To achieve the above-mentioned object, according to a first aspect of the present invention, a choke comprises a single-piece core entirely made of a same material, the single-piece core having two boards and a pillar located between the two boards, a winding space being located among the two boards and the pillar, wherein the pillar has a non-circular and non-rectangular cross section along a direction substantially perpendicular to an axial direction of the pillar, the cross section of the pillar has a first axis and a second axis intersecting with each other at a center of the cross section of the pillar and are substantially perpendicular with each other, the first axis is longer than the second axis, and the cross section of the pillar is substantially symmetrical to both of the first axis and the second axis. The pillar and the two boards are made of magnetic material.

According to a second aspect of the present invention, a choke comprises a single-piece core entirely made of a same material, the single-piece core having two boards and a pillar located between the two boards, a winding space being located among the two boards and the pillar, wherein the pillar has a non-circular and non-rectangular cross section along a direction substantially perpendicular to an axial direction of the pillar, and a circumference of the cross section of the pillar includes two arc edges and a plurality of straights edges, and wherein there is at least one indentation on the circumference of the cross section of the pillar, and each of the at least one indentation is defined by two mutually substantially perpendicular straight edges of the plurality of straight edges, and there is no arc edge located between the two mutually substantially perpendicular straight edges.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE ILLUSTRATED EMBODIMENTS

Figure 1:
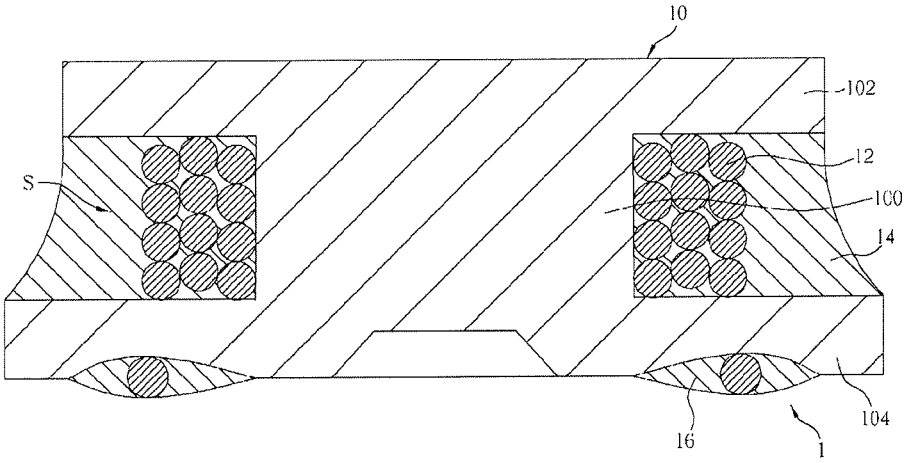
FIG. 1 PRIOR ART
FIG. 1 is a cross-sectional view of a conventional choke.
Figure 2:
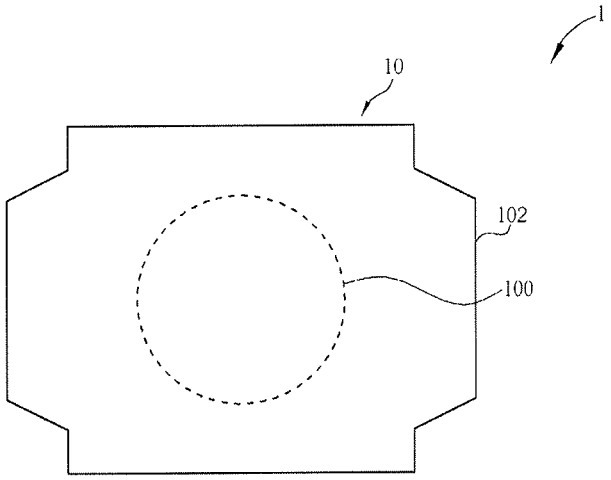
FIG. 2 PRIOR ART
FIG. 2 is a top view of the conventional choke as shown in FIG. 1.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 3:
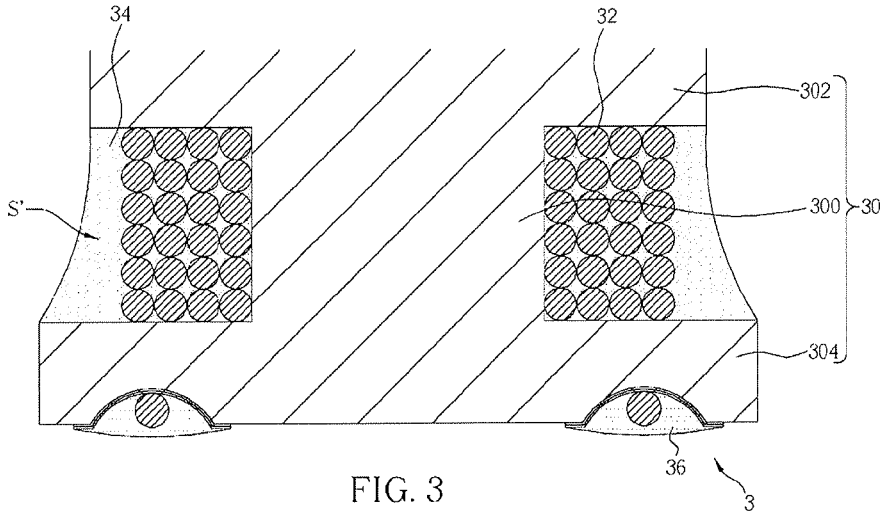
FIG. 3 is a cross-sectional view of a choke according to an embodiment of the present invention.
Figure 4:
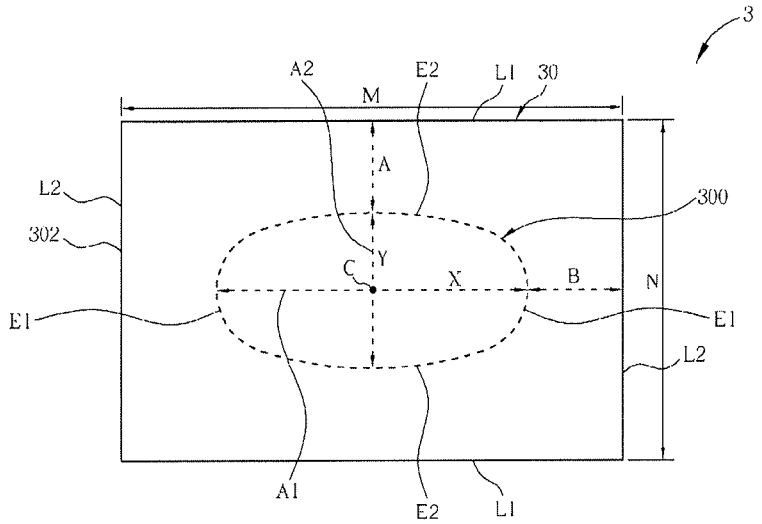
FIG. 4 is a top view of a core adapted for the choke as shown in FIG. 3.

FIG. 3 is a cross-sectional view of a choke 3 according to an embodiment of the present invention, and FIG. 4 is a top view of a core adapted for the choke 3 as shown in FIG. 3. As shown in FIGS. 3 and 4, the choke 3 includes a core 30, at least a wire 32 (only one is illustrated in FIG. 3), a magnetic material 34, and a pair of electrodes 36. The choke 3 is suitable for a small size application. For example, the length*width of the chock 3 is below 4 mm*4 mm, and the height thereof is below 2.5 mm. As embodied in FIG. 3, the upper board 302 has a smaller length than the length of the lower board 304. In another embodiment, the upper board 302 has a larger length than the length of the lower board 304, or an equal length to the length to of the lower board 304.

In detail, the core 30 includes a pillar 300 and two boards 302, 304. The pillar 300 is located between with the two boards 302, 304 and integrally molded with the two boards 302, 304. In an embodiment of the present invention, the core is a single-piece structure entirely made of the same material. In other words, the combination of the pillar and the two boards 302, 304 is a unitary, integral structure, and there is no gap or intervening material/structure at the entire junction between the pillar and each of the two boards 302, 304. In addition, the pillar and the two boards 302, 304 are entirely made of the same material. In an embodiment, the pillar and the two boards 302, 304 are made of same magnetic material (s), such as iron powder, ferrite, permanent magnet and/or other magnetic materials. A winding space S' is formed among the two boards 302, 304 and the pillar 300. For example, in this embodiment, the core 30 can be formed by pressure molding and firing an adhesive mixed with a ferrite powder. Moreover, the ferrite powder includes Ni—Zn ferrite powder or Mn—Zn ferrite powder. Preferably, in this embodiment, the core 30 can be formed by the Ni—Zn ferrite powder. The adhesive includes a polymethylallyl (PMA) synthesize resin, and a linear expansion coefficient thereof is between $1*10^{-5}/°$ C. and $20*10^{-5}/°$ C. In this embodiment, the linear expansion coefficient can be about $13.8*10^{-5}/°$ C.

As shown in FIG. 4, a first axis A1 and a second axis A2 are intersecting with each other at a center C of the cross section of the pillar 300. The cross section of the pillar 300 is along a direction substantially perpendicular to an axial direction of the pillar 300. Each of the two boards 302, 304 has one pair of first edges L1 substantially (i.e., within the range of typical manufacturing deviation) parallel to and longer than the first axis A1 and one pair of second edges L2 substantially (i.e., within the range of typical manufacturing deviation) parallel to and longer than the second axis A2. The first axis A1 is substantially (i.e., within the range of typical manufacturing deviation) perpendicular to and longer than the second axis A2, and the cross section of the pillar 300 has two pairs of arc edges E1, E2. The cross section of the pillar 300 is substantially (i.e., within the range of typical manufacturing deviation) symmetrical to both of the first axis A1 and the second axis A2. For example, the arc edges E1 are opposite to each other with respect to the first axis A1, and the arc edges E2 are opposite to each other with respect to the first axis A1. In this embodiment, the pair of arc edges E1 may be formed as circular-arc shape and the pair of arc edges E2 may be formed as oval-arc shape, so that a periphery/circumference of the cross section of the pillar 300 is non-circular and non-rectangular, such as an oval-like shape. In this embodiment, the pair of arc edges E2 can be formed by a pressure molding process first, and subsequently the pair of arc edges E1 can be formed by a cutting process.

In this embodiment, the first axis A1 starts from a first point on the circumference of the cross section of the pillar 300 and ends at a second point on the circumference of the cross section of the pillar 300. The second axis A2 starts from a third point on the circumference of the cross section of the pillar 300 and ends at a fourth point on the circumference of the cross section of the pillar 300.

In this embodiment, Inequality 1, which is defined as follows, is satisfied:

$$\text{Inequality 1: } 1.2 \le \frac{X}{Y} \le 2.1,$$

wherein X represents a length of the first axis A1 and Y represents a length of the second axis A2.

Furthermore, Inequality 2, which is defined as follows, is satisfied:

$$\text{Inequality 2: } 1.2 \le \frac{M}{N} \le 2,$$

wherein M represents a length of the first edge L1 and N represents a length of the second edge L2. As mentioned above, the length*width of the chock 3 can be below 4 mm*4 mm, so the length M of the first edge L1 can be smaller than or equal to 4 mm.

Moreover, Inequality 3, which is defined as follows, is satisfied:

$$\text{Inequality 3: } 0.8 \le \frac{A}{B} \le 1.2,$$

wherein A represents a half of a difference between the length N of the second edge L2 (i.e., the distance between the first edge L1 and the uppermost/lowermost point of the cross section of the pillar on the second axis A2) and the length Y of the second axis A2, and B represents a half of a difference between the length M of the first edge L1 and the length X of the first axis A1 (i.e., the distance between the second edge L2 and the leftmost/rightmost point of the cross section of the pillar on the first axis A1).

Since the cross section of the pillar 300 of the core 30 is non-circular and non-rectangular (such as an oval-like) rather than circular or rectangular, the area of the cross section of the pillar 300 can be increased accordingly. Therefore, the saturation current of the choke 3 can be raised effectively. Furthermore, since the cross section of the pillar 300 has two pairs of arc edges E1, E2, the wire 32 can be wound around the pillar 300 smoothly and the characteristics of the choke 3 (e.g. saturation current, direct current resistance, magnetic flux density, etc.) are better than those of a conventional choke.

Figure 5:
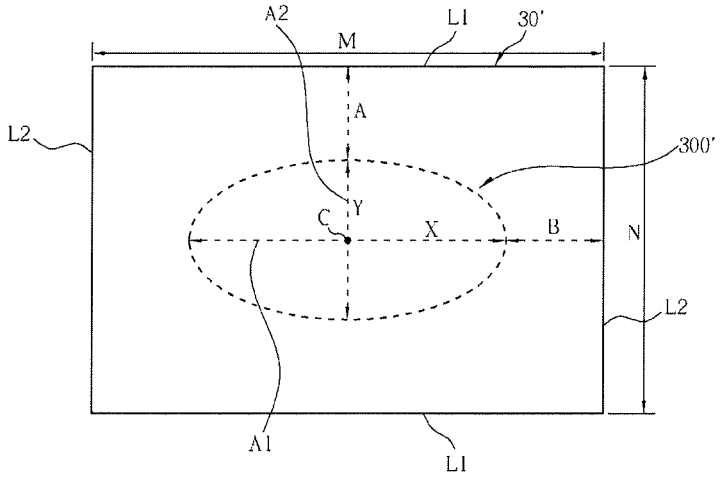
FIG. 5 is a top view of a core adapted for a choke according to another embodiment of the present invention.

FIG. 5 is a top view of a core 30' adapted for a choke according to another embodiment of the present invention. Similar to the embodiment in FIG. 4, the core 30' is a single-piece structure entirely made of the same material. In other words, the combination of the pillar 300' and the two boards is a unitary, integral structure, and there is no gap or intervening material/structure at the entire junction between the pillar 300' and each of the two boards. In addition, the cross section of the pillar 300' is substantially (i.e., within the range of typical manufacturing deviation) symmetrical to both of the first axis A1 and the second axis A2. As shown in FIGS. 4 and 5, the main difference between the aforesaid core 30 and the core 30' is that a periphery/circumference of a cross section of a pillar 300' of the core 30' is non-circular and non-rectangular (such as an oval shape). As shown in FIG. 5, the first axis A1 divides the periphery/circumference of the pillar 300' into two arc edges including an upper arc edge and a lower arc edge, or alternatively the second axis A2 divides the periphery/circumference of the pillar 300' into two arc edges including a right arc edge and a left arc edge. It should be noted that the relationships of X, Y, M, N, A and B also satisfy the aforesaid Inequalities 1, 2 and 3. In this embodiment, the pillar 300' of the core 30' can be formed by a cutting process based on the first and second axes A1, A2.

Figure 6:
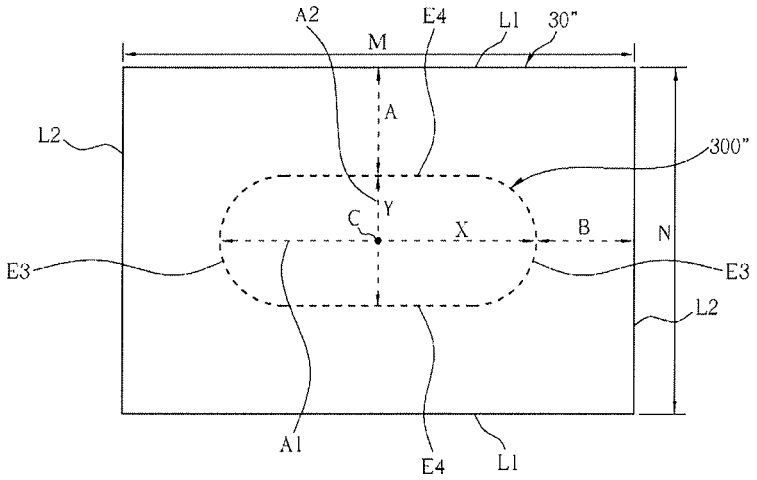
FIG. 6 is a top view of a core adapted for a choke according to still another embodiment of the present invention.

FIG. 6 is a top view of a core 30" adapted for a choke according to still another embodiment of the present invention. Similar to the embodiment in FIG. 4, the core 30" is a single-piece structure entirely made of the same material. In other words, the combination of the pillar 300" and the two boards is a unitary, integral structure, and there is no gap or intervening material/structure at the entire junction between the pillar 300' and each of the two boards. In addition, the cross section of the pillar 300" is substantially (i.e., within the range of typical manufacturing deviation) symmetrical to both of the first axis A1 and the second axis A2. As shown in FIGS. 4 and 6, the main difference between the aforesaid core 30 and the core 30" is that a cross section of a pillar 300" has one pair of arc edges E3 opposite to each other with respect to the second axis A2, and one pair of straight edges E4 opposite to each other with respect to the first axis A1. In addition, the pair of straight edges E4 is located between the pair of arc edges E3, so that a periphery/circumference of the cross section of the pillar 300" is non-circular and non-rectangular (such as an oval-like shape). In this embodiment, the pair of arc edges E3 may be formed as circular-arc. It should be noted that the relationships of X, Y, M, N, A and B also satisfy the aforesaid Inequalities 1, 2 and 3. In this embodiment, the pair of straight edges E4 can be formed by a pressure molding process first, and subsequently the pair of arc edges E3 can be formed by a cutting process.

Figure 7:
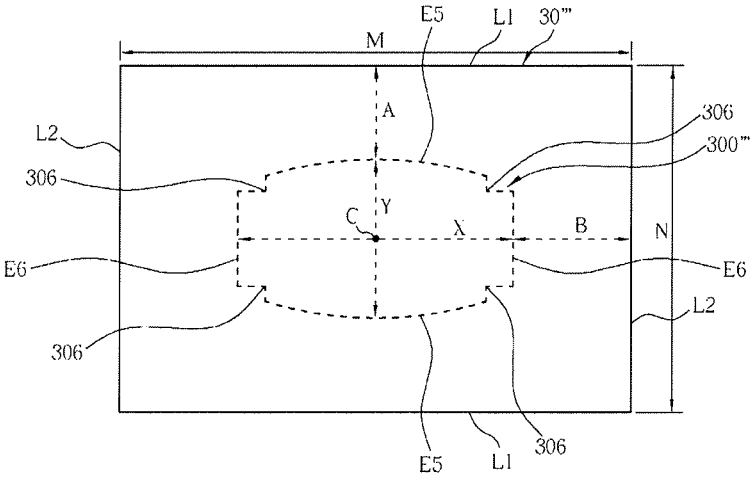
FIG. 7 is a top view of a core adapted for a choke according to further still another embodiment of the present invention.

FIG. 7 is a top view of a core 30'" adapted for a choke according to sill further another embodiment of the present invention. Similar to the embodiment in FIG. 4, the core 30'" is a single-piece structure entirely made of the same material. In other words, the combination of the pillar 300' and the two boards is a unitary, integral structure, and there is no gap or intervening material/stricture at the entire junction between the pillar 300' and each of the two boards. In addition, the cross section of the pillar 300' is substantially (i.e., within the range of typical manufacturing deviation) symmetrical to both of the first axis A1 and the second axis A2. As shown in FIGS. 4 and 7, the main difference between the aforesaid core 30 and the core 30'" is that a cross section of a pillar 300'" has one pair of arc edges E5 opposite to each other with respect to the first axis A1, and one pair of straight edges E6 opposite to each other with respect to the second axis A2. The pair of straight edges E6 substantially (i.e., within the range of typical manufacturing deviation) parallel to the second axis A2 is located between the pair of arc edges E5, and there are four indentations 306 formed at four corners of the pillar 300'" respectively. In particular, the four L-shaped indentations 306 are respectively located at the junctions connecting the arc edges E5 and the straight edges E6. More specifically, the cross section of each of the four L-shaped indentations 306 includes two straight edges substantially (i.e., within the range of typical manufacturing deviation) perpendicular to each other and respectively substantially (i.e., within the range of typical manufacturing deviation) parallel to the first axis A1 and the second axis A2. These two straight edges are substantially (i.e., within the range of typical manufacturing deviation) perpendicular to each other and extend directly from each other, and there is no arc edge located between these two straight edges. In this embodiment, the pair of arc edges E5 may be formed as oval-arc shape so that a periphery/circumference of the cross section of the pillar 300'" is non-circular and non-rectangular (such as an oval-like shape). It should be noted that the relationships of X, Y, M, N, A and B also satisfy the aforesaid Inequalities 1, 2 and 3. In this embodiment, the pillar 300'" of the core 30 can be formed by a pressure molding process immediately. Therefore, the manufacturing process of the pillar 300'" of the core 30 is simpler than prior art and can be used to manufacture a small size core 30 adapted for the choke 3.

Referring to FIGS. 3 and 4 again, the wire 32 of the choke 3 is wound around the pillar 300 and is located in the winding space S'. The wire 32 is formed by a copper wire coated with an enameled layer, and the enameled layer is an insulating layer. The wire 32 can be linear or spiral. Since the pillar 300 has an oval-like shape, when the wire 32 is wound around the pillar 300, the wire 32 can be closely attached to an outer wall of the pillar 300 to effectively wind the wire 32, and a relatively low direct current resistance (DCR) can also be obtained under an equivalent permeability effect. It should be noted that the core 30 in FIGS. 3 and 4 can be replaced by the aforesaid core 30', 30" or 30'", and the aforesaid effect can be also achieved accordingly.

Moreover, the pair of electrodes 36 is disposed on the board 304, wherein the pair of electrodes 36 is formed of laminated metal layers, while the metal layer is formed by, for example, coating, and the laminated metal layers include a silver paste serving as a base material, a nickel layer formed by electroplating, and a tin layer formed by electroplating. Two ends of the wire 32 can be respectively disposed on the pair of electrodes 36 to electrically connect the pair of electrodes 36. Then, a solder paste can be soldered to cover the wire 32, so as to fix the wire 32. The choke 3 is suitable for being electrically connected to external through the pair of electrodes 36 on the board 304 according to a surface mount technology (SMT).

Referring to FIGS. 3 and 4 again, in this embodiment, the magnetic material 34 is filled in the winding space S' and encapsulates the wire 32. The magnetic material 34 can be filled in the winding space S' by coating. The magnetic material 34 is composed of a thermosetting resin and a metallic powder. The thermosetting resin is an organic material not containing volatile solvent, and a viscosity of the thermosetting resin is between 12000 c.p.s. and 30000 c.p.s. The content of the metallic powder in the magnetic material 34 is between 50 wt % and 90 wt %, and, preferably, is between 60 wt % and 80 wt %, and the content of the thermosetting resin is less than 40 wt %. In this embodiment, the viscosity of the thermosetting resin is between 12000 c.p.s. and 18000 c.p.s., and the metallic powder includes an iron powder. Preferably, a surface of the iron powder is coated with insulation.

In detail, when the thermosetting resin and the iron powder are used to form the magnetic material 34, the thermosetting resin can bear a high temperature of more than 350° C. When a heating temperature exceeds a glass transition temperature, so as to satisfy a demand of a desolder temperature, the permeability of the magnetic material 34 can be easily controlled due to utilization of the iron powder. Moreover, since the viscosity of the thermosetting resin is between 12000 c.p.s. and 30000 c.p.s., the iron powder is easily mixed with the thermosetting resin to form the magnetic material 34, a tolerance range of a mixing ratio thereof is relatively high, and the thermosetting resin is easily coated in the winding space S'. Since the content of the thermosetting resin in the magnetic material 34 is less than 40 wt %, and the thermosetting resin does not contain any volatile solvent, during a heat-curing process, a thermal stress generated due to expansion and contraction of the thermosetting resin can be reduced, and the chance of forming blow holes are relatively small. Therefore, cracking of the core 30 can be avoided. In addition, in this embodiment, the permeability of the magnetic material 34 is between 3 and 7 (more preferably, between 4 and 6), and the thermosetting resin is a polymer, for example, a polymethylallyl (PMA) synthesize resin, wherein a linear expansion coefficient of the thermosetting resin is between $1*10^{-5}$/° C. and $20*10^{-5}$/° C., and the glass transition temperature is between 130° C. and 170° C.

Particularly, in this embodiment, the glass transition temperature of the magnetic material 34 is substantially the same as the glass transition temperature of the thermosetting resin, and the linear expansion coefficient is about $13.8*10^{-5}$/° C., and the glass transition temperature is 150° C.

It should be noted that since the magnetic material 34 of this embodiment does not contain any volatile solvent. After the magnetic material 34 is coated, it can be directly heat-cured without being rested in the room temperature for a span of time, and cracking and deforming of the core can be avoided when the magnetic material 34 is heat-cured. Therefore, compared to the conventional technique, not only a fabrication time of the choke 3 can be shortened, but also is a pot-life of the magnetic material 34 not influenced by a formulation ratio. Therefore, the magnetic material 34 is suitable for mass production.

As embodied in the present invention, the cross section of the pillar of the core is substantially (i.e., within the range of manufacturing deviation) symmetrical with respect to both the long axis (e.g., the first axis A1) and the short axis (e.g., the second axis A2) thereof. In addition, compared to the conventional choke, since the cross section of the pillar of the core is non-circular and non-rectangular, such as oval, oval-like, etc., the area of the cross section of the pillar can be increased accordingly. Therefore, the saturation current of the choke can be raised effectively. Furthermore, since the cross section of the pillar has at least one pair of arc edges opposite to each other, the wire can be wound around the pillar smoothly and the characteristics of the choke (e.g. saturation current, direct current resistance, magnetic flux density, etc.) are better than those of a conventional choke.

In addition, since the choke applies the magnetic material formed by the thermosetting resin and the iron powder, after the magnetic material is coated in the winding space, it can be directly heat-cured without being rested in the room temperature. Compared to the conventional technique, not only the fabrication time of the choke can be shortened, but also can cracking and deforming of the drum-core be avoided after the magnetic material is heated. Moreover, the magnetic material is also suitable for mass production.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A choke comprising:

a single-piece core made of a same material, the single-piece core having two boards and a pillar located between the two boards, a winding space being located among the two boards and the pillar, wherein the pillar has a non-circular and non-rectangular cross section along a direction substantially perpendicular to an axial direction of the pillar, the cross section of the pillar has a first axis and a second axis intersecting with each other at a center of the cross section of the pillar and are substantially perpendicular with each other, the first axis is longer than the second axis, and the cross section of the pillar is substantially symmetrical to both of the first axis and the second axis, wherein the first axis starts from a first point on the circumference of the cross section of the pillar and ends at a second point on the circumference of the cross section of the pillar, the second axis starts from a third point on the circumference of the cross section of the pillar and ends at a fourth point on the circumference of the cross section of the pillar, and an inequality is satisfied:

$$1.2 \leq \frac{X}{Y} \leq 2.1,$$

wherein X represents a length of the first axis and Y represents a length of the second axis, and the first axis starts from a first point on the circumference of the cross section of the pillar and ends at a second point on the circumference of the cross section of the pillar, the second axis starts from a third point on the circumference of the cross section of the pillar and ends at a fourth point on the circumference of the cross section of the pillar, each of the two boards has a pair of first edges substantially parallel to and longer than the first axis and a pair of second edges substantially parallel to and longer than the second axis, and an inequality is satisfied:

$$1.2 \leq \frac{M'}{N'} \leq 2,$$

wherein [M'] $N'$ represents a shortest length from the first edge to the center of the cross section of the pillar and [N'] $M'$ represents a shortest length from the second edge to the center of the cross section of the pillar, [and]

wherein the center of the cross section of the pillar and a center of each of the two boards are aligned along the axial direction of the pillar,

*wherein a circumference of the cross section of the pillar includes a plurality of arc edges, and the circumference of the cross section of the pillar further includes a plurality of straight edges, and*

*wherein there are four indentations on the circumference of the cross section of the pillar, and each of the four indentations is defined by two mutually substantially perpendicular straight edges of the plurality of straight edges, and there is no arc edge located between the two mutually substantially perpendicular straight edges.*

2. The choke of claim 1, wherein there is no gap or intervening structure at an entire junction between the pillar and each of the two boards.

[3. The choke of claim 1, wherein a circumference of the cross section of the pillar includes a plurality of arc edges, and the circumference of the cross section of the pillar further includes a plurality of straight edges.]

4. The choke of claim [3] *1*, wherein two of the plurality of straight edges are substantially perpendicular to each other and extend directly from each other, and there is no arc edge located between the two of the plurality of straight edges.

5. The choke of claim 4, wherein the two of the plurality of straight edges form an indentation on the circumference of the cross section of the pillar.

[6. The choke of claim 3, wherein there are four indentations on the circumference of the cross section of the pillar, and each of the four indentations is defined by two mutually substantially perpendicular straight edges of the plurality of straight edges, and there is no arc edge located between the two mutually substantially perpendicular straight edges.]

7. The choke of claim 1, wherein an inequality is satisfied:

$$1.2 \leq \frac{M}{N} \leq 2,$$

wherein M represents a length of the first edges and N represents a length of the second edges.

8. The choke of claim 7, wherein the length of the first edge is smaller than or equal to 4 mm.

9. The choke of claim 1, wherein the first axis starts from a first point on the circumference of the cross section of the pillar and ends at a second point on the circumference of the cross section of the pillar, the second axis starts from a third point on the circumference of the cross section of the pillar and ends at a fourth point on the circumference of the cross section of the pillar, each of the two boards has a pair of first edges substantially parallel to and longer than the first axis and a pair of second edges substantially parallel to and longer than the second axis, and an inequality is satisfied:

$$0.8 \leq \frac{A}{B} \leq 1.2,$$

wherein A represents a half of a difference between a length of the second edges and a length of the second axis, and B represents a half of a difference between a length of the first edges and a length of the first axis.

10. The choke of claim 1, further comprising:

a wire wound around the pillar and located in the winding space; and a magnetic material filled in the winding space and encapsulating the wire, wherein the magnetic material comprises a resin and a magnetic powder, and an average particle diameter of the magnetic powder is smaller than 20 μm.

11. The choke of claim 10, wherein the magnetic powder comprises an iron powder and the iron powder in the magnetic material is between 50 wt % and 90 wt %.

12. The choke of claim 10, wherein the resin comprises a thermosetting resin, a linear expansion coefficient of the thermosetting resin is between $1*10^{-5}/°$ C. and $20*10^{-5}/°$ C., and a class transition temperature of the thermosetting resin is between 130° C. and 170° C.

13. The choke of claim 10, wherein a permeability of the magnetic material is between 3 and 7.

14. The choke of claim 1, wherein the same material is a magnetic material and the single-piece core is a single-piece magnetic core.

* * * * *